May 30, 1939. L. M. PERSONS 2,160,623
CONTROL CASING
Filed May 11, 1936
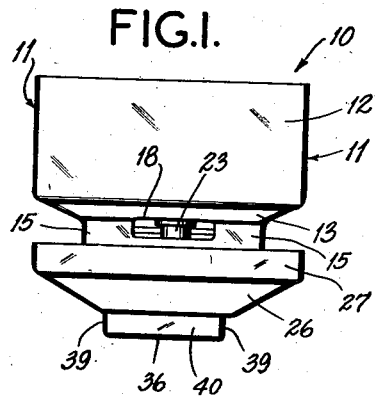
FIG.1.
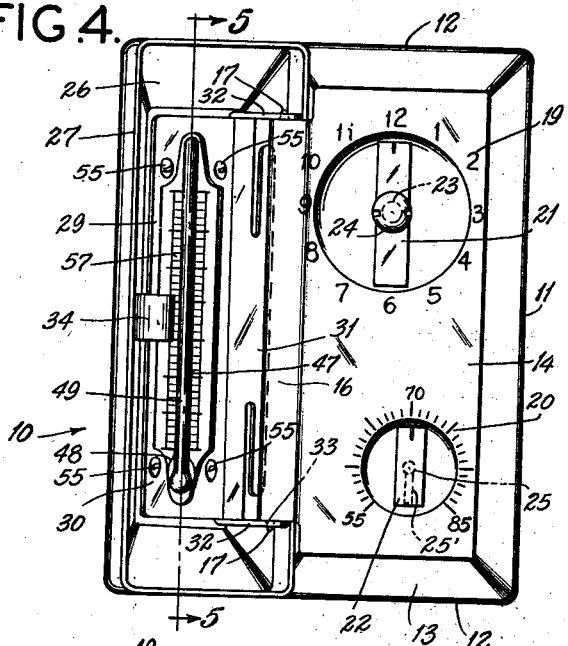
FIG.4.
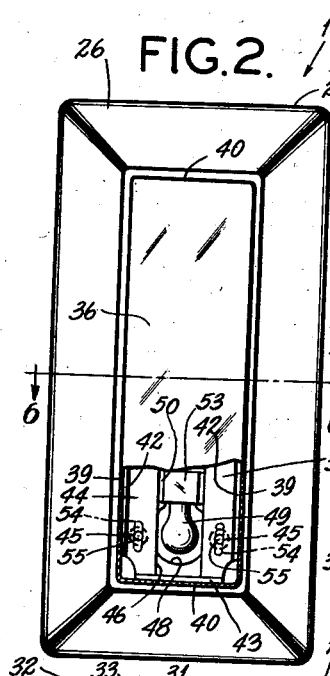
FIG.2.
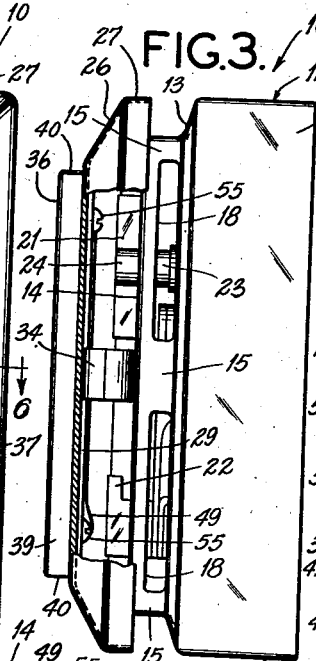
FIG.3.
FIG.5.
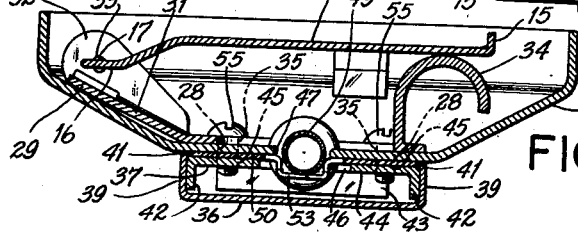
FIG.6.
FIG.7.
INVENTOR:
LAWRENCE M. PERSONS,
By Lawrence Lexingland
ATTORNEY.

Patented May 30, 1939

2,160,623

UNITED STATES PATENT OFFICE 2,160,623

CONTROL CASING

Lawrence M. Persons, St. Louis, Mo., assignor, by mesne assignments, to Automatic Control Corporation, St. Louis, Mo., a corporation of Delaware Application May 11, 1936, Serial No. 79,051

7 Claims. (Cl. 297—11)

The present invention relates generally to control casings, and more particularly to a control casing adapted to contain within a concealed interior a plurality of related elements.

Heretofore, control casings have been constructed generally along open faced lines. It is readily apparent that such constructions are objectionable from many viewpoints. In view of the fact that the control pointers are located in full view of an occupant of the room, or the like, in which the casing is mounted, the device lends itself very little to an esthetic presentation. Then, the exposed face is not readily adapted to dusting and cleaning, inasmuch as the usual pointers are prone to snag cloths, and the like, passed thereover. Further, the present day casings are normally provided with air holes around the sides for ventilation of the encased control mechanisms, which are unsightly. Other disadvantages, well known to those experienced in the art, are likewise present in casing constructions now used.

It is an object of the present invention to provide a control casing which comprises, in effect, a closed container for the pointers and related elements.

Another object is to provide a control casing which readily lends itself to ornamental purposes.

Another object is to provide a control casing adapted to support in concealed positions a plurality of control and related elements.

Another object is to provide a control casing which is of compact construction.

Another object is to provide a control casing adapted to support a plurality of control and related elements for convenient manipulation and observation.

Another object is to provide a control casing so constructed as to provide ventilation for the control mechanism.

Another object is to provide a control casing economical to manufacture, readily adapted for general use, and of inherent esthetic features.

Other objects and advantages will appear from the following description thereof, taken in connection with the accompanying drawing, in which Fig. 1 is a top view of a preferred embodiment of a control casing constructed in the light of the present invention.

Fig. 2 is a front elevation, parts being broken away to more clearly illustrate certain details.

Fig. 3 is a side elevation, parts being broken away to more clearly illustrate certain details.

Fig. 4 is a front elevation with the cover open, illustrating a preferred disposition of control pointers and related elements.

Fig. 5 is a section on the line 5—5 of Fig. 4.

Fig. 6 is a section on the line 6—6 of Fig. 2.

Fig. 7 is a view in perspective of the cover mounting member.

A control casing constructed in line with the present invention is adapted to enclose a thermostat and time control mechanism, such as are used in the remote control of furnaces and the like. Manually-manipulative pointers of the thermostat and the time control mechanism play over a platform which is screened from view by a spaced cover. The cover, in addition to serving as a screen, supports in the inner face a thermometer. Thus, a convenient, compact assemblage is obtained.

Referring more particularly to the drawing by reference numerals, 10 indicates generally a preferred embodiment of a control casing constructed in the light of the present invention, which is shown of generally rectangular configuration, but which, it is to be understood, may be of other shapes. The casing is preferably constructed of metal selectively enameled, but other constructions and finishings are contemplated by the invention.

The control casing or box includes a base having sides 11, ends 12, and a front face 13 which serves to enclose the working parts of the control mechanisms. A platform 14 is offset from the face 13 of the base and is connected thereto by supporting flange segments 15. The face has a cut-out therein which underlies the platform and allows air, which passes between the segments through the openings 18, to enter the base. The platform terminates at one side in an offset flange 16, which has, at each end thereof, a pivot extension 17. The platform is marked by appropriate dials 19 and 20 with which pointers 21 and 22, respectively, cooperate. In the present disclosure, the pointer 21, which is connected to a pivot post 23 by securing means as a screw 24, serves as a control indicator for an automatic timing mechanism. The pointer 22, connected by securing means as a screw 25' to a pivot post 25 which extends through the platform, serves as a control indicator for temperature control mechanism. It is, of course, palpable that the arrangement and disposition of the pointers and their respective dials may be varied within a wide range and yet remain within the scope of the present invention.

There is provided a cover 26 which, due to a flange 27 extending around the full periphery, is adapted to conceal the platform and its associated elements from observation and to ornamentally enhance the casing. Spaced holes 28 are provided in the cover for a purpose to be disclosed below. The cover is connected to the platform by means of a combination support and hinge member, generally designated 29, shown in perspective in Fig. 7. The member 29 includes a flat cut-out portion 30, a flat spring 31, pivot ears 32 having apertures 33 therein, and a stop 34. The flat portion is provided with holes 35, by means of which the cover 26 is connected to the member 29, and is centrally cut-out for a purpose to be disclosed below. An ornamental cap 36 is secured centrally to the exterior face of the cover by means of a strip, generally indicated 37, disposed within the flange walls 39 and 40 of the cap, which are crimped, as at 41, to maintain a fixed relation between flanges 42, 43 of the strip and said walls, respectively. The strip 37 includes a flat portion 44 having threaded apertures 45 which are disposed to align with the aforementioned holes 35 in the member 29, and having a longitudinally, centrally disposed opening 46 cut therein.

The cover 26 has a central longitudinally disposed slit 47 therein, enlarged, as at 48, at one end to receive a thermometer 49, which is of a cross-section sufficiently large to be retained behind the slit. The thermometer is provided with a carriage 50, which has an aperture 51 at one end thereof adapted to receive an extension 52 disposed at the end of the thermometer remote from the bulb. The carriage 50 has a transverse piece 53 of U-shape disposed near the bulb, which is adapted to receive the thermometer tube therewithin, as can be readily appreciated from an inspection of Fig. 6. The carriage has slots 54 therethrough which are disposed to fall in alignment with the above-mentioned holes 35 and 45, and which are adapted to allow adjustment of the thermometer relative to the scale 57 marked on the interior of the cover.

Securing means, as bolts 55, pass consecutively through the holes 35, 28 and slots 54 and engage the threads in the holes 44 to draw the member 29, the cover 26, the carriage 50, and the strip 37 into the assemblage shown clearly in Fig. 6. Before drawing the bolts 55 tight, the thermometer is placed on the carriage in rear of the cover so that the tube is visible through the slit.

The cover assemblage is connected to the base by snapping the ears 32 over the pivot members 17. The spring 31 is disposed to contact the offset flange of the platform so as to bias the cover for maintaining it either in closed or open position.

It will be observed that the applicant has provided a casing which is adapted to fulfill all of the objects sought therefor. When one desires to use the control pointers, the cover is swung on its pivot to the position shown in Fig. 4, when the dials may be readily manipulated and the thermometer inspected. After the settings have been made, the cover is closed to the position shown in Fig. 3, the stop 34 abutting against the platform to cooperate with the spring to maintain the cover and base in their predetermined related disposition.

It is to be understood that the above description and accompanying drawing are presented as an illustration and not for the purpose of limitation, the invention being limited only by the following claims.

What is claimed is:

1. A control casing comprising a base, said base being hollow and of a depth to house control mechanisms, a platform offset from one face thereof, ventilation openings between said platform and said one face, dials on said platform, a cover pivotally connected to said platform, and a thermometer fastened to said cover interiorly thereof, whereby said dials and thermometer can be simultaneously inspected in one position of the cover and are concealed in another position of the cover.

2. A control casing comprising a hollow base, a platform offset from one face thereof, ventilation openings between the platform and the said face leading into the base, and a cover pivotally connected to the platform.

3. A control casing comprising a base adapted to enclose control mechanisms, a platform spaced from the base having dials thereon, an offset flange along one side of the platform, and a cover pivotally connected to the flange adapted in one extreme position thereof to enclose the platform.

4. A control casing comprising a base adapted to enclose control mechanisms, a platform spaced from a face of said base by means which provide ventilation for the interior of the base, dials marked on the platform, a cover hinged to an offset flange along one side of the platform, means in the cover to support a thermometer, said cover being adapted to swing into position relative to said base to shield said platform from view and to allow air to pass to the thermometer.

5. A control casing including a base, a cover pivotally connected thereto, a slit in the cover, a cap covering said slit exteriorly of the cover, a thermometer carriage disposed between the cap and the cover, a thermometer resting in the carriage and adapted to fill the slit for inspection therethrough, and means connecting the cover, the carriage, and the cap to form an assembled unit.

6. A control casing including a cover, a slot in the cover having a degrees scale along the edges thereof and on the inner face of the cover, a cap secured to the outside of the cover and fully overlying the slot to provide an unbroken exterior for the cover, and a thermometer disposed within and outlining the slot for cooperation with the scale, said thermometer being inspective only from the inner side of the cover.

7. A control casing comprising a hollow base, a platform offset from one face thereof, ventilation openings between the platform and the said face leading into the base, and a cover pivotally mounted to enclose said platform without blocking said openings while in one position and to permit inspection of said platform and the inner side of the cover while in another position.

LAWRENCE M. PERSONS.